Patented Dec. 19, 1950

2,534,646

UNITED STATES PATENT OFFICE 2,534,646

MONOAZO-DYESTUFFS

Willy Widmer, Bottmingen, Alphonse Heckendorn, Basel, and Emil Mannhart, Riehen, Switzerland, assignors to Ciba Limited, Basel, Switzerland, a Swiss firm No Drawing. Application July 15, 1949, Serial No. 105,064. In Switzerland September 29, 1948

1 Claim. (Cl. 260—200)

According to this invention a valuable new monoazo dyestuff free from carboxylic acid and sulfonic acid groups is made by coupling diazotized 4-chloro-5-nitro-2-amino - 1 - hydroxybenzene with 2-hydroxynaphthalene-6-sulfonic acid amide.

The 2-hydroxynaphthalene-6-sulfonic acid amide, which is a known compound, can be prepared by reacting with ammonia 2-hydroxynaphthalene-1-carboxylic acid-6-sulfonyl chloride obtainable from 2-hydroxy-naphthalene - 1 - carboxylic acid by the action of chloro-sulfonic acid, and heating the product in a weakly alkaline medium to split off the very mobile carboxyl group in the 1-position of the naphthalene ring.

The diazotized 4-chloro-5-nitro-2-amino-1-hydroxybenzene is advantageously coupled in an alkaline medium with the hydroxynaphthalene sulfonic acid amide. For example, the hydroxynaphthalene sulfonic acid amide may be dissolved in the necessary quantity of a solution of an alkali hydroxide, and then alkali carbonate added and the diazo compound added to the resulting solution.

The monoazo dyestuff obtainable by the present process is new. It is free from carboxylic acid and sulfonic acid groups and corresponds to the formula

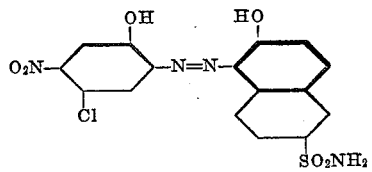

This dyestuff is suitable for dyeing or printing a very wide variety of materials. Especially valuable results are obtained when this dyestuff is treated with agents yielding metal. This treatment may be carried out in known manner in substance, in the dyebath or on the fiber.

The new dyestuff is suitable above all for dyeing by the single bath chroming process in which a solution containing the dyestuff and also an agent yielding chromium is used. A dyeing process of this kind is, for example, that in which there is used a solution containing the dyestuff and also an alkali chromate, for example, sodium chromate or potassium chromate, and ammonium sulfate. By this process, there are obtained with the new dyestuff especially on wool, but also on artificial fibers of superpolyamides or superpolyurethanes, very valuable dyeings which are distinguished by very good properties of wet fastness and above all by a very good to excellent fastness to light.

The new dyestuff obtainable by the present process is also suitable for dyeing by the known after-chroming process, whereby valuable fast dyeings are also obtained.

The following examples illustrate the invention, the parts and percentages being by weight:

Example 1

22.3 parts of 2-hydroxynaphthalene-6-sulfonic acid amide are dissolved in 200 parts of water and 11.2 parts of potassium hydroxide and coupled in the presence of 20 parts of sodium carbonate at 0° C. with the diazo compound obtained in the usual manner from 19 parts of 5-nitro-4-chloro-2-amino - 1 - hydroxybenzene. Coupling sets in immediately and is complete in 4 hours. The dyestuff formed, which corresponds to the formula

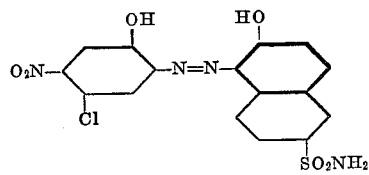

is isolated by filtration, washed with dilute sodium chloride solution and dried. There is obtained a black powder which dissolves in hot water with a blue-violet coloration and in concentrated sulfuric acid with a red coloration. The dyestuff dyes wool navy blue tints by the single bath process in the presence of an agent yielding chromium.

Example 2

A dyebath is prepared with 2 parts of potassium chromate, 2 parts of ammonium sulfate, 10 parts of crystalline sodium sulfate and 3 parts of the dyestuff obtainable as described in Example 1. 100 parts of well wetted wool are entered into the dyebath at 60° C., the temperature is raised to the boil in the course of 30 minutes, and boiling is continued for 45 minutes. There are then added 0.5 part of acetic acid of 40 per cent. strength and boiling is continued for a further 45 minutes. The wool is dyed a fast navy blue tint.

Having thus described the invention, what is claimed is:

The monoazo-dyestuff of the formula

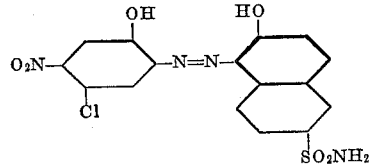

WILLY WIDMER.
ALPHONSE HECKENDORN.
EMIL MANNHART.

No references cited.